United States Patent
Liang et al.

(10) Patent No.: US 9,541,130 B2
(45) Date of Patent: Jan. 10, 2017

(54) ROLLING BEARING WITH ROLLING BODIES DISPOSED IN A PLURALITY OF CAGE SEGMENTS

(71) Applicant: AKTIEBOLAGET SKF, Göteborg (SE)

(72) Inventors: Baozhu Liang, Dittelbrunn-Hambach (DE); Jesko-Henning Tanke, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/784,070

(22) PCT Filed: Apr. 11, 2014

(86) PCT No.: PCT/EP2014/057409
§ 371 (c)(1),
(2) Date: Oct. 13, 2015

(87) PCT Pub. No.: WO2014/167107
PCT Pub. Date: Oct. 16, 2014

(65) Prior Publication Data
US 2016/0084310 A1    Mar. 24, 2016

(30) Foreign Application Priority Data
Apr. 11, 2013  (DE) .......... 10 2013 206 347

(51) Int. Cl.
*F16C 33/46* (2006.01)
*F16C 33/50* (2006.01)
(Continued)

(52) U.S. Cl.
CPC .......... *F16C 33/467* (2013.01); *F16C 19/26* (2013.01); *F16C 19/364* (2013.01);
(Continued)

(58) Field of Classification Search
CPC . F16C 19/364; F16C 33/4676; F16C 33/4682; F16C 33/51; F16C 33/513; F16C 19/26; F16C 2240/46; F16C 2360/31; F16C 2300/14; F16F 19/361
(Continued)

(56) References Cited

U.S. PATENT DOCUMENTS 1,444,964 A * 2/1923 Foster .................... F16C 19/34
384/571
1,966,266 A * 7/1934 Skelly .................. F16C 33/4682
384/573
(Continued)

FOREIGN PATENT DOCUMENTS

DE  31 14 325 A1  10/1982
DE  102 46 825 A1  4/2004
(Continued)

*Primary Examiner* — Marcus Charles
(74) *Attorney, Agent, or Firm* — Bryan Peckjian; SKF USA Inc. Patent Dept.

(57) ABSTRACT

A rolling-element bearing includes inner and outer rings and a cage between the rings, the cage having a plurality of cage segments with lateral boundary walls defining a receiving pocket for a rolling element having a diameter $D_w$, the pockets being dimensioned such that in a load-free state the rolling elements are positionable in the receiving pockets with a circumferential clearance (c) on the pitch circle between adjacent boundary walls of the pocket such that the clearance satisfies the relationship: $c_{max} \geq c \geq c_{min}$, where: $c_{min} = 0.01 \cdot D_w - 0.5$ mm and $c_{max} = 0.02 \cdot D_w - 0.4$ mm, and wherein the diameter ($D_w$) of the rolling-element bearing is at least 50 mm.

11 Claims, 2 Drawing Sheets

Figure 1:
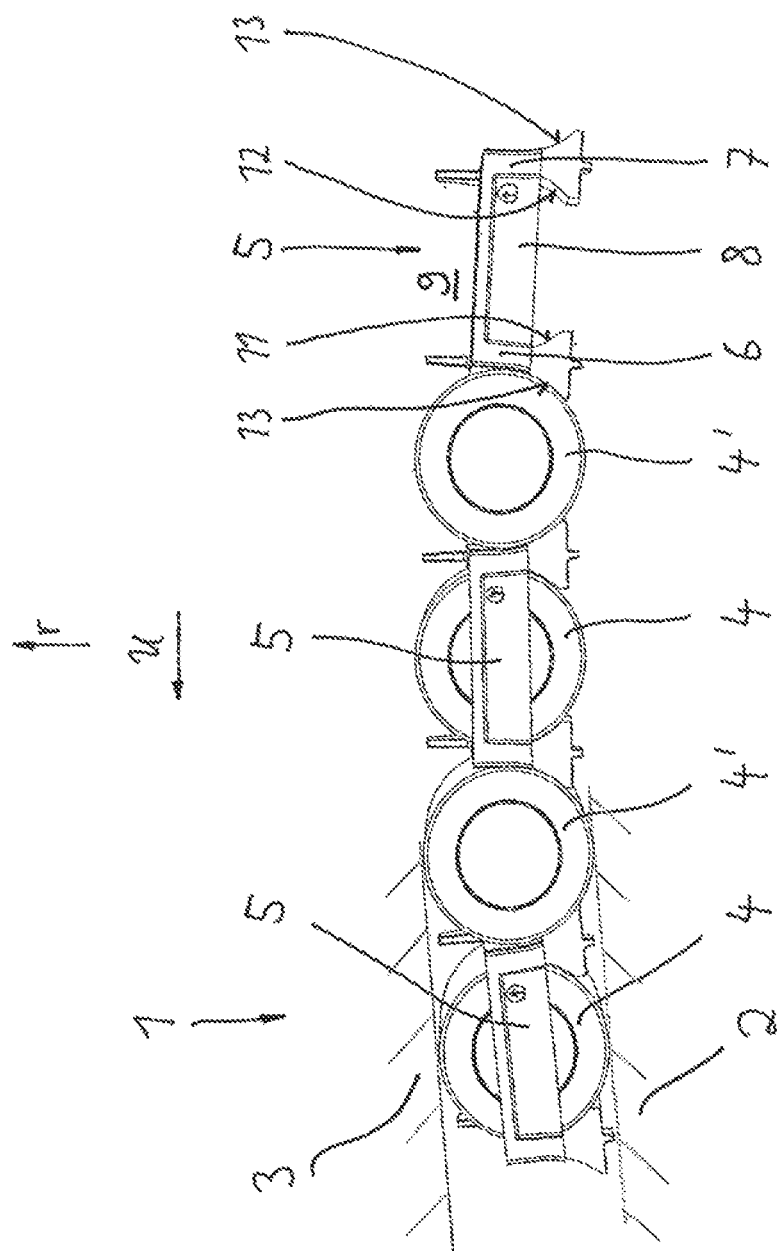

(51) Int. Cl.
 *F16C 19/26* (2006.01)
 *F16C 19/36* (2006.01)
 *F16C 33/51* (2006.01)

(52) U.S. Cl.
 CPC .......... *F16C 33/4605* (2013.01); *F16C 33/50* (2013.01); *F16C 33/51* (2013.01); *F16C 2240/44* (2013.01); *F16C 2240/46* (2013.01); *F16C 2300/14* (2013.01)

(58) Field of Classification Search
 USPC ....... 384/548, 553, 565, 568, 571, 572, 573, 384/576, 578, 580, 551; 29/898.067
 See application file for complete search history.

(56) References Cited

U.S. PATENT DOCUMENTS

| | | | | |
|---|---|---|---|---|
| 2,969,267 | A * | 1/1961 | Gothberg | F16C 23/086 384/580 |
| 3,445,907 | A * | 5/1969 | Greby | F16C 33/4629 29/558 |
| 3,733,111 | A * | 5/1973 | Harlan | F16C 19/364 384/576 |
| 3,881,790 | A * | 5/1975 | Ryanen | F16C 33/4676 384/576 |
| 4,222,620 | A * | 9/1980 | Mirring | F16C 19/26 384/576 |
| 4,534,095 | A * | 8/1985 | Olschewski | F16C 33/467 29/898.067 |
| 5,033,878 | A * | 7/1991 | Tsuji | F16C 23/086 384/576 |
| 5,295,749 | A * | 3/1994 | Takahashi | F16C 23/086 384/568 |
| 6,715,927 | B1* | 4/2004 | Torisawa | F16C 19/26 384/572 |
| 8,591,121 | B2* | 11/2013 | Suzuki | F16C 33/4635 384/572 |
| 2012/0082409 | A1 | 4/2012 | Miyachi | |
| 2015/0078699 | A1* | 3/2015 | Gessendorfer | F16C 19/364 384/573 |

FOREIGN PATENT DOCUMENTS

| | | | |
|---|---|---|---|
| DE | 10 2006 022 951 A1 | 11/2007 | |
| DE | 20 2008 017 091 U1 | 3/2009 | |
| DE | 102008027082 A1 * | 12/2009 | ........... F16C 33/508 |
| DE | 11 2009 002 624 T5 | 9/2011 | |
| DE | JP 2012077882 A * | 4/2012 | |
| DE | 102011004374 A1 * | 8/2012 | .......... F16C 33/4611 |
| DE | 102012216364 A1 * | 3/2014 | .............. F16C 41/04 |
| DE | 102013224541 A1 * | 6/2015 | .......... F16C 33/4611 |
| DE | 102014207836 A1 * | 10/2015 | ............ F16C 19/225 |
| JP | 2012 026 534 A | 2/2012 | |
| WO | 2012/076583 A2 | 6/2012 | |

* cited by examiner

ROLLING BEARING WITH ROLLING BODIES DISPOSED IN A PLURALITY OF CAGE SEGMENTS

CROSS-REFERENCE

This application is the U.S. National Stage of International Application No. PCT/EP2014/057409 filed on Apr. 11, 2014, which claims priority to German patent application No. 10 2013 206 347.4 filed on Apr. 11, 2013.

TECHNOLOGICAL FIELD

The invention relates to a rolling-element bearing including at least one inner ring and at least one outer ring, wherein a number of rolling elements having a diameter are disposed between the bearing rings, wherein the rolling elements are held by a cage, wherein the cage is comprised of a number of cage segments, wherein each cage segment is comprised of a frame-shaped structure, wherein a plurality of lateral boundary walls form a receiving pocket for a rolling element, wherein the receiving pocket is dimensioned such that in the load-free state of the rolling-element bearing there is a clearance in the circumferential direction of the rolling-element bearing on the pitch circle of the rolling-element bearing between the lateral surfaces of the receiving pocket, which lateral surfaces face the rolling element, and the rolling element received by the receiving pocket.

BACKGROUND

A rolling-element bearing of the above-described type is known from WO 2012/076583 A2. Instead of a classical one-piece bearing cage, here the cage is formed by a number of cage segments. This has the advantage that there is a particularly good suitability for large tapered roller bearings, and the loads occurring here can be particularly well supported. Furthermore, the individual cage segments can be installed well; a low cage weight can simultaneously be achieved. The formation of the cage segments makes possible a secure receiving of the rolling element and a reliable guiding of the cage segment on the rolling element. In intended usage here the cage segments do not come into contact; they are not connected to one another.

US 2012/0082409 A1, DE 10 2006 022 951 A1, DE 11 2009 002 624 T5, DE 20 2008 017 091 U1, DE 102 46 825 A1, DE 31 14 325 A1, and JP 2012 026 534 A disclose further similar and also different solutions.

Here the mentioned segmented cages have been proven in particular in large bearings. In operation, forces arise between the cage segments and the adjacent rolling elements. They are both dynamic and also static forces depending on the operating state of the rolling-element bearing.

The cage segments should be as thin-walled as possible in order to be able to use as many rolling elements as possible, which, however, is limited because the cages should not be damaged by the forces mentioned.

SUMMARY

The object of the invention is to further develop a bearing of the above-described type such that the disadvantage mentioned can be eliminated. Accordingly the cage segments should be designed such that on the one had they can be kept small in the circumferential direction in order to be able to accommodate as many rolling elements as possible in the bearing. However, then they should also be designed such that even in the operating state under high load no negative effects occur on the running behavior of the bearing. Overall an improved running behavior of the rolling-element bearing should thereby result.

The solution of this object by the invention is characterized in that the clearance in each axial section of the rolling-element bearing satisfies the relationship:

$$c_{max} \geq c \geq c_{min}$$

with:

$$c_{min} = 0.01 * Dw - 0.5 \text{ mm and}$$

$$c_{max} = 0.02 * Dw - 0.4 \text{ mm},$$

wherein the diameter of the rolling-element bearing is at least 50 mm.

The clearance (in mm) thus results in the defined range based on the diameter of the rolling element Dw (in mm) in each axial section, provided the diameter is not in any case constant over the axial extension of the rolling element (as in the case of a cylindrical roller bearing). The diameter of the rolling element Dw is multiplied by the factors mentioned (0.01 or 0.02), and the respective mentioned amount (0.5 mm or 0.4 mm) is deducted in order to obtain the minimum and the maximum clearance c.

Here a cage segment preferably receives a rolling element with its receiving pocket, wherein a rolling element following this rolling element in the circumferential direction is kept free from a cage segment so that rolling elements located in a receiving pocket and rolling elements not located in a receiving pocket are alternately disposed in the circumferential direction. Here the cage segment preferably includes two running surfaces, each for a rolling element adjacent in the circumferential direction.

Generally, with uniform distribution of the clearance in the rolling-element bearing on the pitch circle of the rolling-element bearing, there is a clearance in the circumferential direction of the rolling-element bearing between the running surface of the cage segment and the rolling element adjacent to the cage segment in the circumferential direction. Here between the clearance (c) between the lateral surfaces of the receiving pocket and the rolling element received in the receiving pocket, and the total clearance (x) (i.e., summed over the entire circumference) between the running surface of the cage segment and the rolling element adjacent to the cage segment in the circumferential direction, there is preferably the relationship:

$$c < 0.2 \ x.$$

The cage segments can be rolling-element-guided, raceway-guided, or flange-guided or shoulder-guided.

The cage segments are preferably formed as one-piece plastic molded parts.

The disclosed improvements are preferably used in a tapered roller bearing or in a cylindrical roller bearing.

The inventive concept leads to a clearance in the cage pocket, which is set such that with the loading of the cage in the nominal operating state of the rolling elements they can run freely in the interior of the cage without being clamped by the surrounding cage. However, in the rarely occurring operating states having significantly higher loads, these loads press the cage together so far that the rolling element deploys its support effect and protects the cage from damage. Due to the rarity of these occurrences and their short duration, the clamping of the rolling elements under these conditions has no negative effect on the further operating behavior of the bearing. Thus a high security against extreme operating states is achieved with smaller overall dimensions.

Inside the pocket of the cage segment the rolling element has a defined clearance (c) in the circumferential direction of the bearing. Here the clearance is selected and set such that upon exceeding a certain load on the cage segment, contact occurs between the rolling element lying in the receiving pocket and the cage segment, which leads to an additional supporting effect and improves the force-absorbing ability of the cage.

If a larger region of the bearing circumference is unloaded, the cage segments are loaded in the respective lower part of the unloaded zone by the summed mass of the rolling elements lying thereover. The clearance (c) is dimensioned sufficiently large such that under these loads a clamping of the rolling element inside the receiving pocket does not result.

The clearance (c) is sufficiently dimensioned such that, during normal operation of the rolling-element bearing the receiving pocket does not deform enough to clamp the rolling element inside the receiving pocket. Since the force required to clamp the rolling element in the receiving pocket can be set in a controlled manner, the magnitude of loads that will cause clamping and loads that will not cause clamping can readily be determined.

However, the cage clearance (c) is also set in a targeted manner such that when exceeding a certain load of an adjacent rolling element on the cage segment, the resulting cage deformation is so large that the rolling element is clamped inside the receiving pocket of the cage segment, and the cage is thus supported by the rolling element. The load that the cage can withstand thereby increases.

The proposed maximum and minimum cage clearance takes into account the elastic behavior of the cage material and results from the above-mentioned relationships for suitable roller sizes, i.e.:

$$c_{max} \geq c \geq c_{min}$$

with:

$$c_{min} = 0.01*Dw - 0.5 \text{ mm and}$$

$$c_{max} = 0.02*Dw - 0.4 \text{ mm},$$

with c (in mm) as the clearance in the cage pocket in the circumferential direction of the bearing and Dw as the roller diameter (in mm).

The inexpensive plastic cage segments can also be used with larger roller masses.

With the disclosed embodiments, large bearings are preferably equipped with cylindrical rollers or tapered rollers. While one-pocket cage segments are preferably provided, multiple-pocket-segment cages are also possible.

In an advantageous manner an increase of the supportable loads on the segmented bearing cage thus results due to the supporting effect of the adjacent roller elements.

Figure 2:
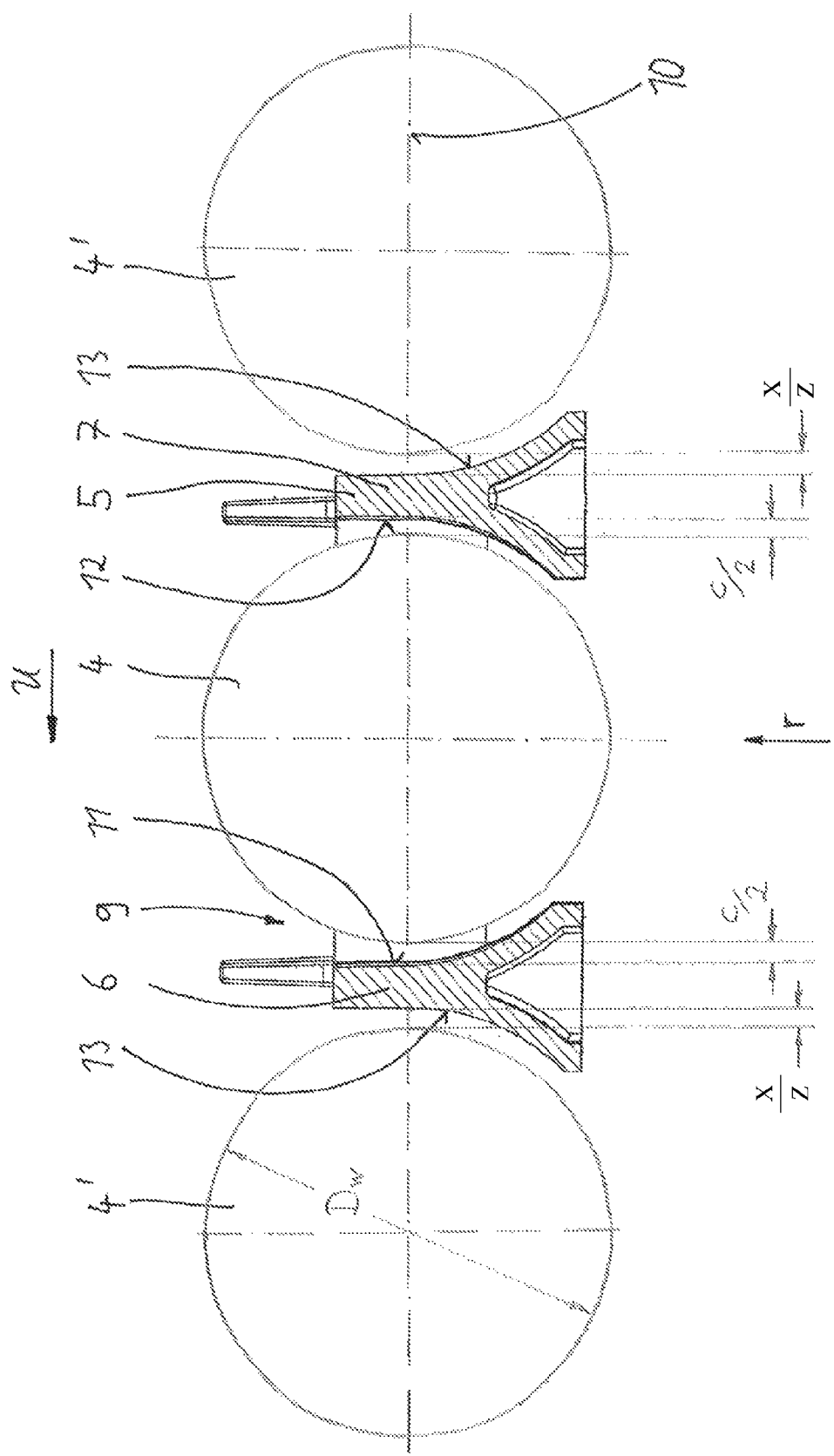

An exemplary embodiment of the invention is depicted in the drawings:

FIG. 1 shows a part of a tapered roller bearing, seen in the axial direction, and FIG. 2 shows an enlarged section from FIG. 1 in an axial section, wherein three adjacent tapered rollers are visible, wherein the central one is held by a cage segment.

In the figures the inventive concept is illustrated for the use in a tapered roller bearing.

The rolling-element bearing 1 in the form of a tapered roller bearing includes an inner ring 2 and an outer ring 3, wherein rolling elements 4, 4' are disposed between the bearing rings 2, 3. The rolling elements 4, 4' are not held by a classical cage: rather, cage segments 5 are provided, which are disposed between the rolling elements. For details in this regard reference is expressly made to WO 2012/076583 A2 of the applicant.

Each cage segment 5 includes a frame-type structure, which is formed by four boundary walls; boundary walls 5, 6, and 7 are visible in the Figures, i.e. three of the altogether four walls that form a receiving pocket 9 for a rolling element 4.

In each axial section the conical rolling element 4 has a diameter Dw. Here the rolling elements lie on a pitch circle 10 (course of the centerpoints of the rolling elements 4).

The cage pockets 9 are bounded by lateral surfaces 11 and 12, which are formed on the boundary walls 6 and 7 and which are at least sectionally adapted to the shape of the rolling element 4.

Rolling elements 4, which are located in a receiving pocket 9 of the cage segment 5, and rolling elements 4', which are free from a cage segment 5, alternate here in the circumferential direction U. However, for their guiding a running surface 13 is provided on both sides of the cage segment 5.

In FIG. 2 the clearance c on the pitch circle is recorded, which clearance a rolling element 4 has in the receiving pocket 9 in the load-free state of the bearing (in the symmetric depiction according to FIG. 2 the clearance c is divided in half on the two lateral surfaces 11 and 12).

Also recorded is the clearance x/z (with z as the number of rolling elements), assumed uniformly distributed over the circumference U on the pitch circle 10, which clearance x/z is present in the circumferential direction U between the rolling element 4' and the running surface 13. The clearance x thus represents the total clearance of the rolling-element series summed over the circumference.

The relationships specified above apply for the size of the clearance c in a receiving pocket 9 and the ratio of this clearance c to the total clearance x.

REFERENCE NUMBER LIST

1 Rolling-element bearing
2 Inner ring
3 Outer ring
4 Rolling element
4' Rolling element
5 Cage segment
6 Boundary wall
7 Boundary wall
8 Boundary wall
9 Receiving pocket
10 Pitch circle
11 Lateral surface
12 Lateral surface
13 Running surface
Dw Diameter of the rolling element
c Clearance
x (Total) clearance
z Number of rolling elements
K Constant
U Circumferential direction
r Radial direction

The invention claimed is:

1. A rolling-element bearing comprising:
at least one inner ring;
at least one outer ring, and a cage disposed between the at least one inner ring and the at least one outer ring, the cage comprising a plurality of cage segments, each cage segment having a plurality of lateral boundary walls defining a receiving pocket for a rolling element, the rolling element having a diameter (Dw), each of the receiving pockets being dimensioned relative to the rolling element in the receiving pocket such that in a load-free state of the rolling-element bearing one of the plurality of rolling elements is positionable in the receiving pocket between the at least one inner ring and the at least one outer ring with a circumferential clearance (c) on the pitch circle of the rolling-element bearing between circumferentially adjacent, mutually facing, boundary walls of the receiving pocket and the rolling element in the receiving pocket, wherein the clearance (c) satisfies the relationship:

$$cmax \geq c \geq cmin$$

where:

$$cmin = 0.01 * Dw - 0.5 \text{ mm and}$$

$$cmax = 0.02 * Dw - 0.4 \text{ mm, and}$$

wherein the diameter (Dw) of the rolling-element bearing is at least 50 mm, and wherein, with uniform distribution of the clearance (c) in the rolling-element bearing on the pitch circle of the rolling-element bearing, there is a total clearance (x) in the circumferential direction of the rolling-element bearing between the running surfaces of the cage segments and the rolling elements in the circumferential direction, and wherein a relationship between the clearance (c) and the total clearance (x) is: $c < 0.2x$, wherein the cage is configured such that when a load on the cage provided by an adjacent roller element located outside of the cage exceeds a predetermined amount, the cage deforms so that the rolling element inside of the pocket is clamped by the cage.

2. The rolling-element bearing according to claim 1, wherein the plurality of cage segments comprise a plurality of separate cage segments, each adjacent pair of cage segments being separated by a gap, wherein a first set of the plurality of rolling elements is located in the cage segments and a second set of the plurality of rolling elements is located in the gaps.

3. The rolling-element bearing according to claim 2, wherein each of the cage segments includes first and second running surfaces configured to guide the rolling element in the cage segment.

4. The rolling-element bearing according to claim 3, wherein the cage segments are rolling-element-guided, wherein the cage segments are configured as one-piece plastic molded parts and wherein the rolling elements are cylindrical rolling elements.

5. The rolling-element bearing according to claim 3, wherein the cage segments are raceway-guided, wherein the cage segments are configured as one-piece plastic molded parts, and wherein the rolling elements are tapered rolling elements.

6. The rolling-element bearing according to claim 1, wherein the cage segments are rolling-element-guided.

7. The rolling-element bearing according to claim 1, wherein the cage segments are raceway-guided.

8. The rolling-element bearing according to claim 1, wherein the cage segments are flange-guided or shoulder-guided.

9. The rolling-element bearing according to claim 1, wherein the cage segments are configured as one-piece plastic molded parts.

10. The rolling-element bearing according to claim 1, wherein the rolling elements are cylindrical rolling elements.

11. The rolling-element bearing according to claim 1, wherein the rolling elements are tapered rolling elements.

* * * * *